United States Patent [19]
Esch et al.

[11] Patent Number: 5,572,968
[45] Date of Patent: Nov. 12, 1996

[54] INTERNAL-COMBUSTION ENGINE HAVING AN OIL RETURN SYSTEM

[75] Inventors: Hans-Joachim Esch, Heimsheim; Albrecht Reustle, Walheim; Winifried Distelrath, Stuttgart, all of Germany

[73] Assignee: Dr. Ing. h.c.F. Porsche AG, Weissach, Germany

[21] Appl. No.: 499,993

[22] Filed: Jul. 10, 1995

[30] Foreign Application Priority Data

Jul. 9, 1994 [DE] Germany ............... 44 24 248.4

[51] Int. Cl.⁶ .............. F01M 1/02; F01M 1/10; F16N 9/00
[52] U.S. Cl. ...................... 123/196 M; 184/6.5
[58] Field of Search ............ 123/196 R, 196 M; 184/6.2, 6.5, 6.23

[56] References Cited

U.S. PATENT DOCUMENTS

| | | |
|---|---|---|
| 1,860,813 | 5/1932 | Nutt . |
| 5,072,809 | 12/1991 | Shibata ...................... 184/6.2 |
| 5,123,385 | 6/1992 | Sado et al. ................. 123/196 M |
| 5,195,474 | 3/1993 | Urata et al. ................ 123/196 M |
| 5,295,463 | 3/1994 | Wenger et al. . |

FOREIGN PATENT DOCUMENTS

| | | |
|---|---|---|
| 0 399 216 | 11/1990 | European Pat. Off. . |
| 2 625 256 | 6/1989 | France . |
| 40 07 939 | 8/1991 | Germany . |
| 523203 | 7/1940 | United Kingdom . |

OTHER PUBLICATIONS

Patent Abstracts of Japan, JP5005409, Jan. 14, 1993, Sawara Masanori.

*Primary Examiner*—Erick R. Solis
*Attorney, Agent, or Firm*—Evenson, McKeown, Edwards & Lenahan, P.L.L.C.

[57] ABSTRACT

An internal-combustion engine comprises two cylinder banks inclined with respect to a vertical line and has two overhead camshafts respectively which are driven by way of an intermediate shaft by the crankshaft. The connection between the camshafts and the intermediate shaft takes place by way of driving devices which extend in timing cases. In order to maintain consistent oil levels in the cylinder heads which fluctuate during an acceleration or a cornering, a lubricant pump is arranged on each of the cylinder heads which, on the suction side, is connected with the cylinder head and, on the delivery side, is connected with the oil pan. The lubricant pump is continuously driven by the camshaft.

18 Claims, 7 Drawing Sheets

INTERNAL-COMBUSTION ENGINE HAVING AN OIL RETURN SYSTEM

BACKGROUND AND SUMMARY OF THE INVENTION

This invention relates to an internal-combustion engine having two cylinder banks inclined with respect to the vertical line and, more particularly, to an engine of this type having an oil return system.

Internal-combustion engines having inclined cylinder banks are known in numerous constructions and embodiments and are designed, for example, as V-engines or horizontally opposed engines. An internal-combustion engine of this type is known, for example, from European Patent Document EP 399 216 B1. In the case of this internal-combustion engine, the two overhead camshafts arranged in the cylinder head are driven by an intermediate shaft by way of one timing chain respectively. This intermediate shaft, in turn, is connected with the crankshaft by way of a short chain drive. In this case, the two timing chains are each guided in a timing case by way of which the cylinder head and the crankshaft case are connected with one another. In the driving operation of the motor vehicle, fluctuations of the oil level occur particularly during acceleration, deceleration and cornering. In an extreme case, this may result in one of the two cylinder heads almost completely filling with oil, by way of the connection between the crankshaft case and the cylinder head, while the other runs dry.

From German Patent Document DE 40 07 939 C1, a device is known for returning lubricating oil from a timing space of a cylinder head of an internal-combustion engine. In this case, a lubricant pump is mounted on the cylinder head and is connected on the suction side with a collector and whose delivery pipe is arranged outside the engine section and leads to the oil reservoir. The suction-side collector is also mounted on the outside of the cylinder head housing and is connected with the interior of the cylinder head via bores which are each arranged between two cylinders. The only purpose of this lubricating device is to return the lubricating oil flowing out of the bearings of the camshaft.

It is an object of the present invention to compensate for fluctuations of the oil level of an internal-combustion engine, particularly to avoid an excessive rising or falling of the oil level in the cylinder head during acceleration, deceleration and/or cornering.

This object has been achieved according to the present invention by providing an oil return system which returns oil from each cylinder head to an oil reservoir. One lubricant pump is provided for each cylinder head which takes in oil from the cylinder head and pumps it back into the common oil reservoir, compensating for operationally caused fluctuations of the oil level in the cylinder heads. The oil is therefore pumped back against the effect of the acceleration forces or the centrifugal forces. By arranging the lubricant pumps directly on the cylinder head and by driving them via the camshaft, a continuous operation of the lubricant pumps is ensured in a simple, low-cost manner which is advantageous with respect to mounting. The lubricant pumps therefore do not require any activating sensory mechanism and high-expenditure control devices or high-expenditure drives.

The respective arrangement of the lubricant pump on the exterior wall of the cylinder head results in easy mounting and exchange, as required. Furthermore, according to this arrangement of the lubricant pumps, the space in the interior of the cylinder head is kept free of disturbing influences.

A delivery-side oil-air separating element effectively prevents the oil from foaming. This oil-air separating element may be constructed, for example, as a splash baffle or as a so-called swirl pot.

Advantageously, this oil-air separating element may be housed in the interior of the crankshaft case so that the outer dimensions of the engine will not be increased. Particularly in the case of engines in a horizontally opposed arrangement, the housing in the crankshaft case easily provides for minimize space requirements.

The suction action of the lubricant pump is particularly good if the suction pipe does not exceed a defined length. It is therefore advantageous to arrange the suction pipe in the area of the front wall on which the lubricant pump is mounted, leading directly into the cylinder head. In this case, the suction pipe may extend as a cast or bored duct in the wall of the cylinder head housing.

An advantageous connection pattern for the lubricant pump is obtained when the suction pipe is arranged at least partially in the cylinder head cover. In view of the connection pattern and the overall size, the construction of the lubricant pump as an internal gear pump is advantageous. This internal gear pump may have a relatively compact construction so that the outer dimensions of the overall engine will be only insignificantly changed by means of the mounted pump.

The delivery ducts may be advantageously arranged at least partially in a housing wall in the area of the respective timing case or of the housing section guiding the driving device. By constructing the delivery ducts as cast or bored ducts in the wall of the corresponding housing section, external or internal pipe lines will not be required. The ducts can therefore be produced when the housing is manufactured.

In the crankshaft case, an advantageous housing area for the oil-air separating elements exists approximately in the center of the longitudinal course of the crankshaft, where the constructional gaps between the individual connecting rods may be utilized. In this case, the oil-air separating elements may be advantageously arranged on both sides of the crankshaft, forming a V-shaped or vertical arrangement. This type of construction allows efficient use of the housing space, while permitting a good separating action of air and oil.

These and other objects, features and advantages of the present invention will become more readily apparent from the following detailed description when taken in conjunction with the accompanying drawings.

DETAILED DESCRIPTION OF THE DRAWINGS

Figure 1:
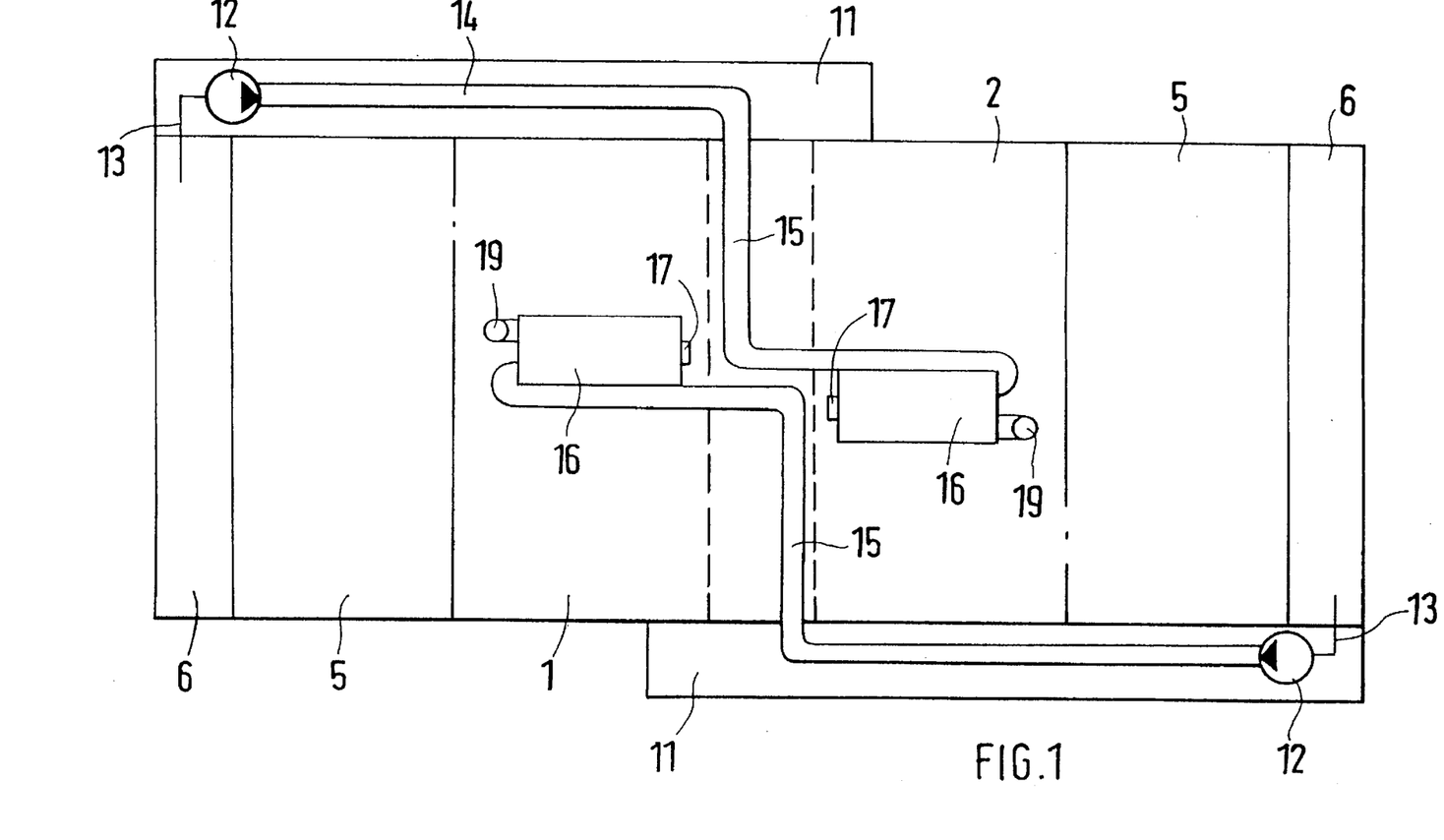
FIG. 1 is a schematic top view of an internal-combustion engine according to the present invention.
Figure 2:
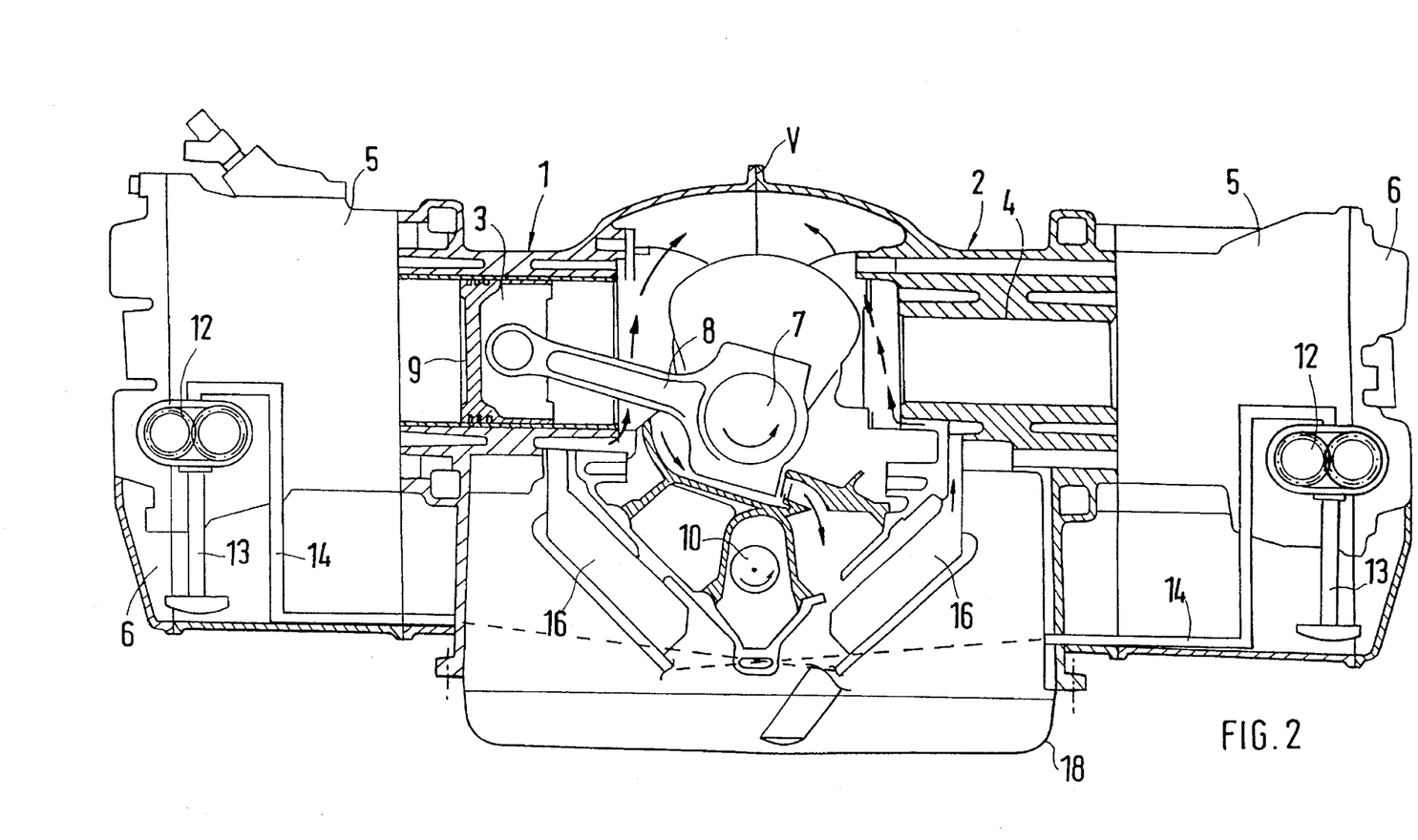
FIG. 2 is a schematic sectional view of an internal-combustion engine with horizontally opposed cylinders taken transversely with respect to the crankshaft.

The internal-combustion engine, which is schematically illustrated in FIGS. 1 and 2, comprises a two-part crankcase 1, 2 with two banks of cylinders 3, 4 which are inclined with respect to the vertical line V. In the basic diagram illustrated here and in the following embodiment, the internal-combustion engine is constructed as a horizontally opposed engine. However, the invention also relates to internal-combustion engines in a V-shape.

The two banks of cylinders 3, 4 are each covered by a cylinder head 5 in which the valve gear is housed. Each of the two cylinder heads 5 is closed off by a cylinder head cover 6. In the crankshaft case 1, 2, a crankshaft 7 is disposed which is driven by way of a connecting rod 8 and the respective piston 9. The crankshaft 7 is connected with a lower intermediate shaft 10 which drives the camshafts arranged in the cylinder head 5 via corresponding driving devices, such as toothed belts or timing chains. These driving devices run in timing cases 11 fixed to the engine section, one being arranged on the front face of the internal-combustion engine and the other being arranged on the rear face of the internal-combustion engine.

The interior of the respective cylinder head 5 and the interior of the crankshaft case 1, 2 are connected with one another by way of these timing cases 11. Thus, a connection exists between the two cylinder heads by way of the respective timing cases and the crankshaft case. In the top view, this connection has approximately the shape of a Z-duct. If, as in this embodiment, the internal-combustion engine is mounted with a crankshaft which is aligned in parallel to the driving direction, the oil level will fluctuate during cornering. In this case, the oil level will increase significantly in the cylinder head 5 which is on the outside during the cornering, while the oil level will fall considerably in the cylinder head which is on the inside during the cornering. In order to compensate for these fluctuations, a lubricant pump 12 is mounted on each cylinder head, is driven by a camshaft and takes in oil from the cylinder head by way of a suction pipe 13.

The oil is pumped via delivery ducts 14, which extend in the housing wall in the area of the timing cases 11, and adjoining longitudinal ducts 15 in the crankshaft case 1, 2 to air-oil separating elements 16. These are arranged inside the crankshaft case and separate the air-oil mixture. Correspondingly, their drain opening 17 leads into the lower part of the crankshaft case 1, 2 or into the oil pan 18 situated underneath. The upper breathing opening 19 is connected with an upper part of the crankshaft case above the oil level. In FIG. 2, the duct course is partially shown by a broken line.

Figure 3:
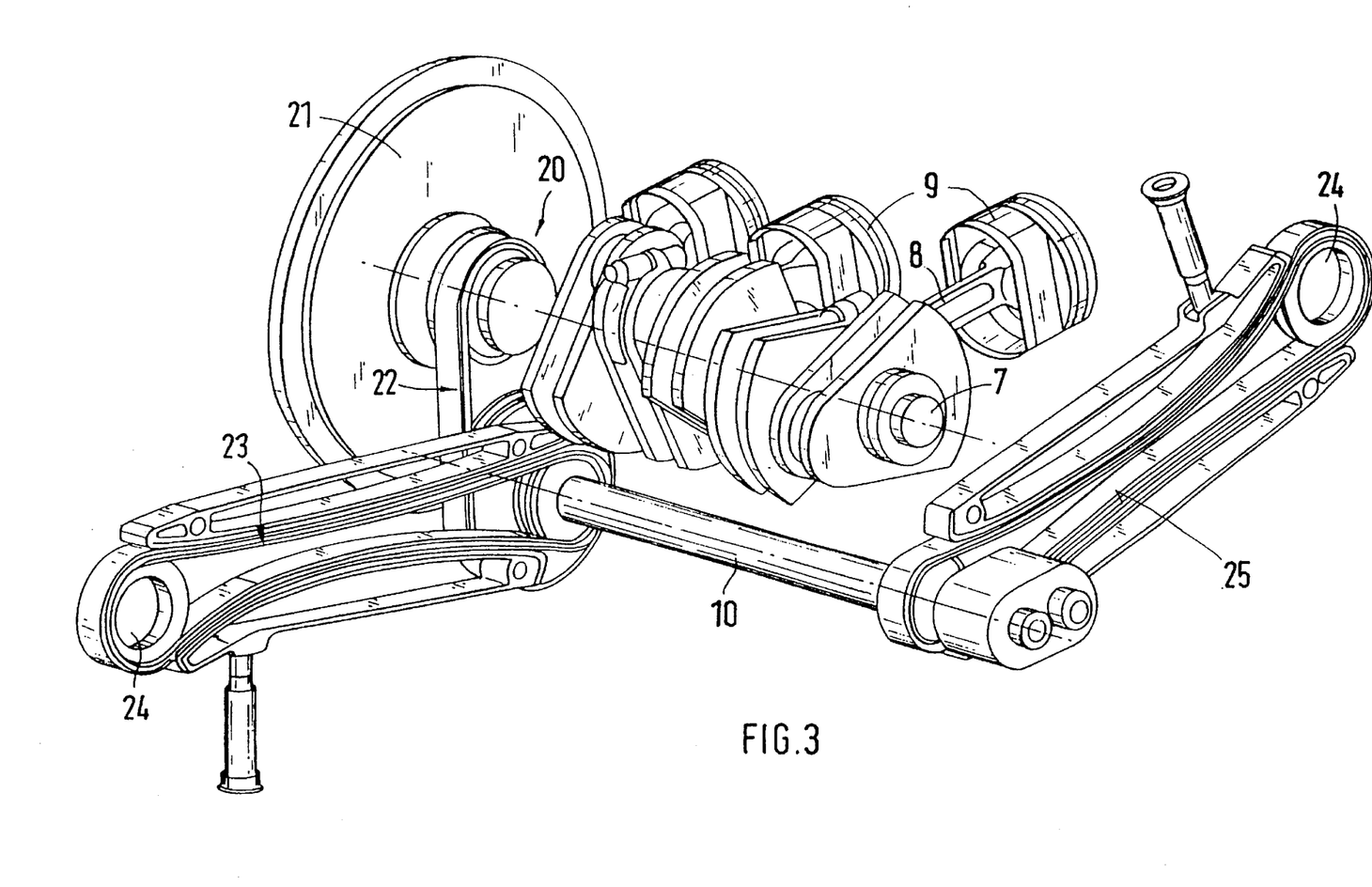
FIG. 3 is a perspective view of a timing drive of the present invention.
Figure 4:
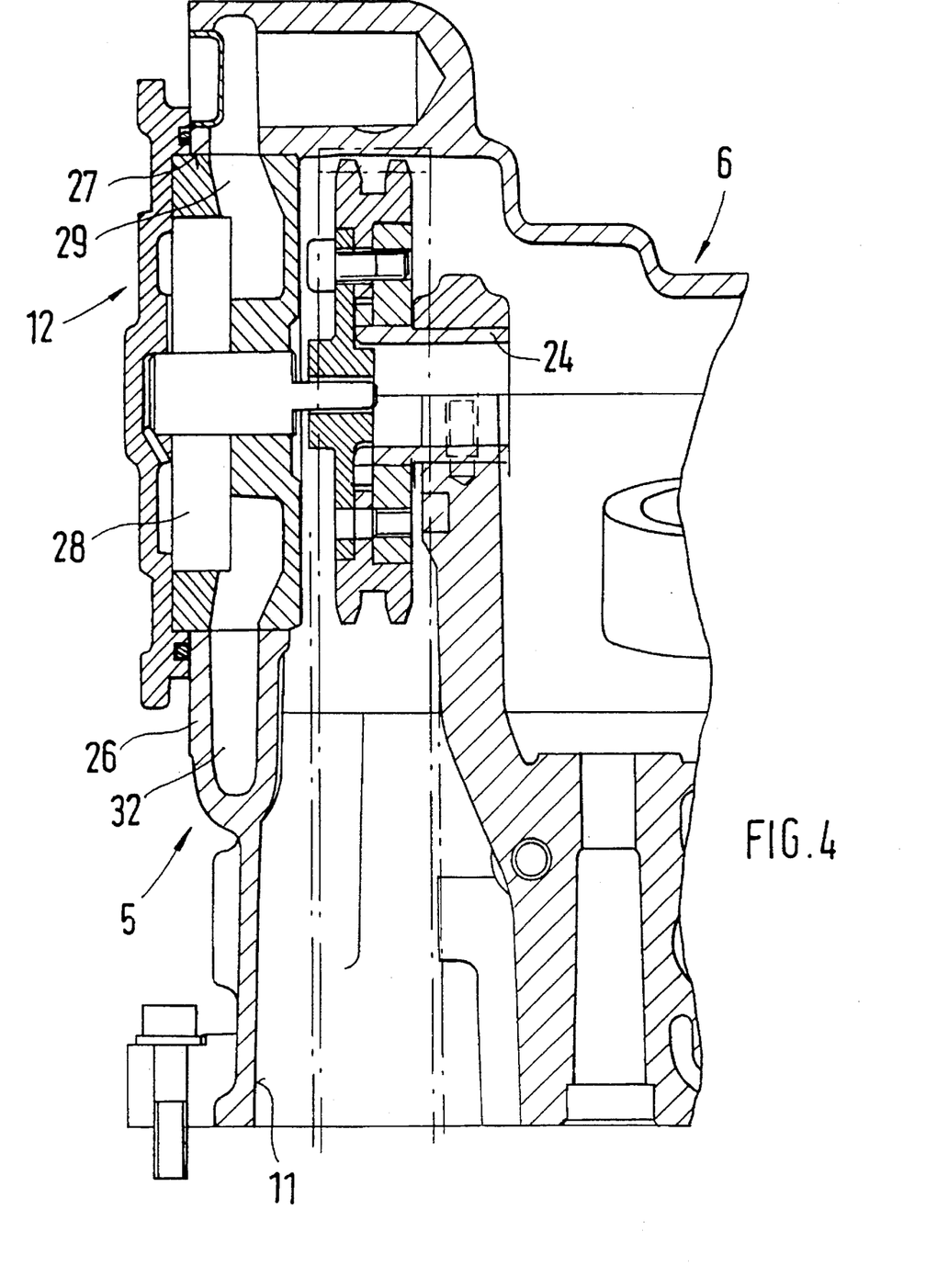
FIG. 4 is a sectional top view of the cylinder head of FIG. 2.
Figure 5:
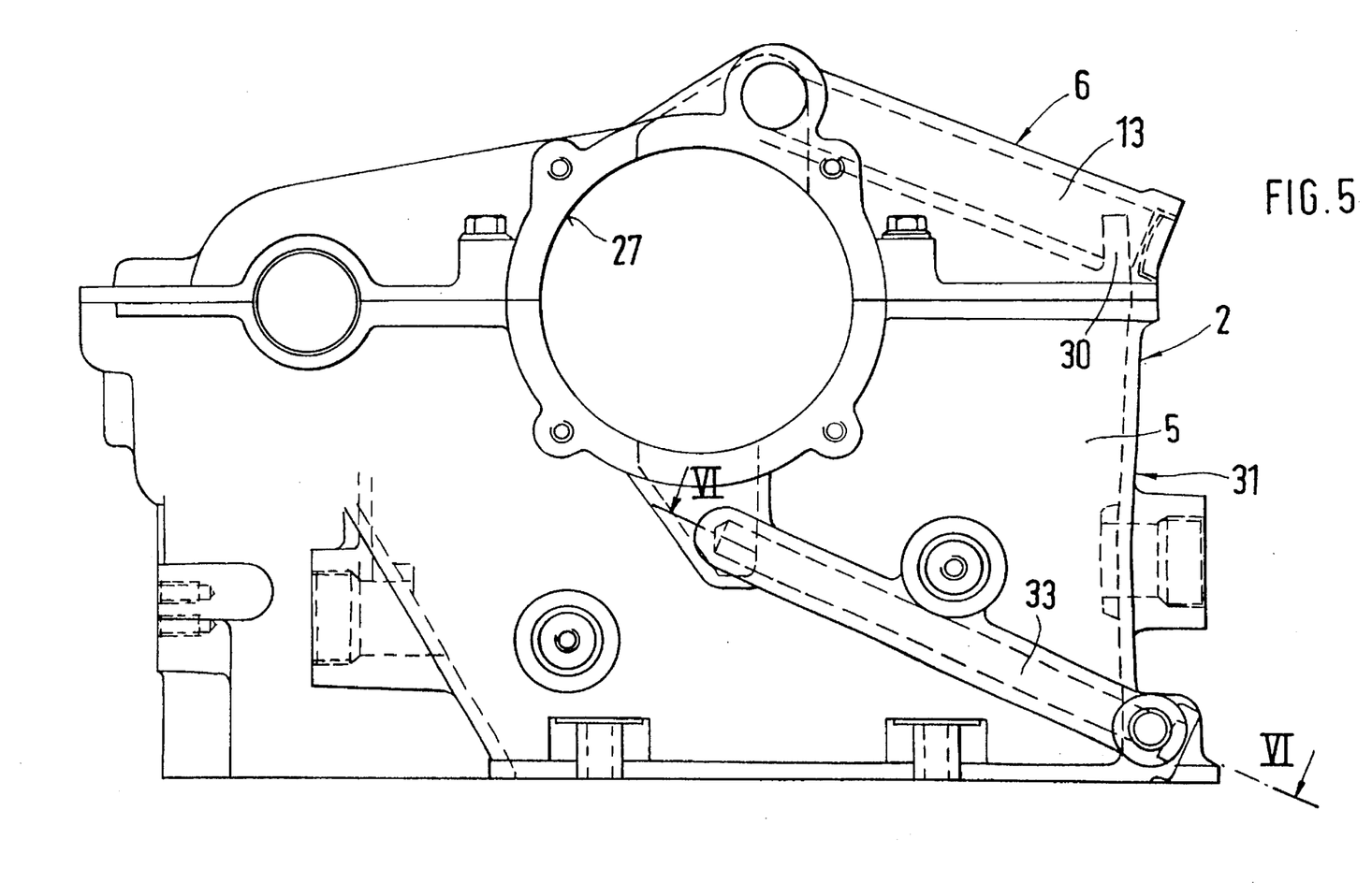
FIG. 5 is a front view of the cylinder head of FIG. 2.

FIG. 3 is a simplified illustration of the timing drive of an embodiment of the invention, in which case, for the purpose of clarity, only the piston and the connecting rods of one cylinder bank are shown. In this embodiment, the internal-combustion engine is illustrated as a 6-cylinder horizontally opposed engine. This invention includes any other engine construction with two cylinder banks inclined with respect to the vertical line, particularly V-engines. In this case the number of cylinders may range from one cylinder per cylinder bank to six cylinders per cylinder bank and more.

On one end section 20, the crankshaft 7 carries a flywheel 21 and adjacent thereto a drive 22 for an intermediate shaft 10 which extends below the crankshaft in parallel thereto. In the area of the flywheel, a first driving device 23, such as a toothed belt or a timing chain, is driven by the intermediate shaft. This first driving device 23 is guided in the timing case 11 and is connected with the camshaft 24 disposed in the cylinder head 5. On the side of the crankshaft which is away from the flywheel, this crankshaft is connected with a second driving device 25 which is guided in the opposite timing case 11 and is connected with the camshaft 24 of the opposite cylinder head 5. On one front wall 26 respectively, a receiving opening 27 is formed in the area of the transition between the cylinder head 5 and the cylinder head cover 6, one lubricant pump 12 respectively being inserted into the receiving opening 27.

Figure 6:
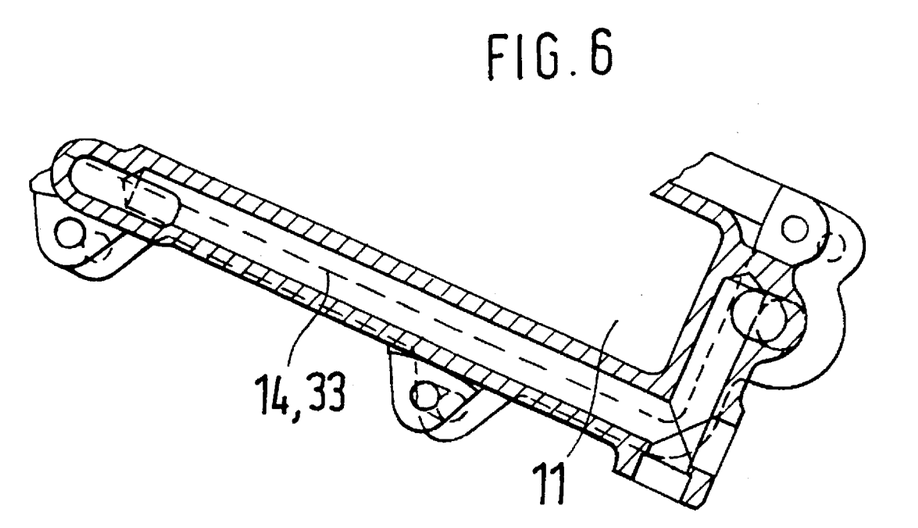
FIG. 6 is a sectional view of a part of the oil guide according to Line VI—VI of FIG. 5.

In a preferred embodiment, this lubricant pump 12 is constructed as an internal gear pump, the internal gear 28 being non-rotatably connected with the camshaft 24. The lubricant pump is advantageously arranged on the front wall of the respective timing case 11. The suction side 29 of the lubricant pump 12 is connected with the suction pipe 13. This suction pipe 13 is constructed in a wall of the cylinder head cover 6. The suction opening 30 is situated in the area of the wall 31 of the cylinder head 5 which is on the bottom in the installed condition. The delivery side 32 of the lubricant pump is connected with a section 33 of the delivery pipe 14 which is constructed in the cylinder head 5. As illustrated in FIG. 6, this section 33 is formed by several mutually connected bores which are formed in the walls of the cylinder head 5. This section 33 of the delivery pipe is connected with another section 34 constructed in the crankshaft case 1, 2, which section 34 extends in the bottom area of the crankshaft case and of the timing case 11. The additional section 34 is also composed of several mutually connected bores in the case and leads out into a longitudinal duct 15 which extends approximately in parallel to the crankshaft 7. In each case, this longitudinal duct 15 has an expanded section 35 approximately in the center of the crankshaft 7, the inlet pipe 36 of the respective oil-air separating element leading into the expanded section 35.

Figure 7:
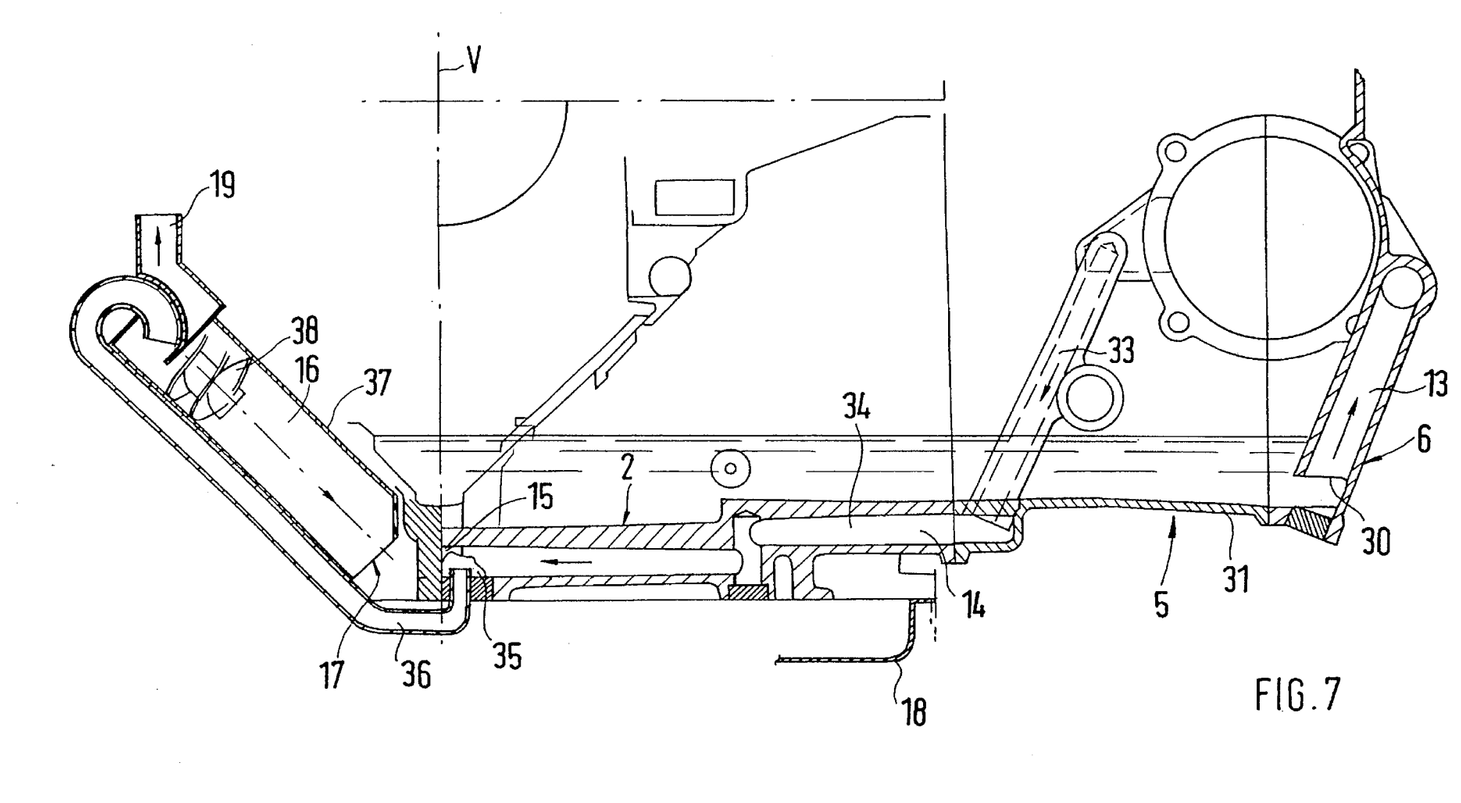
FIG. 7 is a cross-sectional view of the engine section taken along the course of the duct shown in FIG. 1.

In a preferred embodiment, the respective oil-air separating element 16 is arranged on the side of the crankshaft 7 which faces away from the corresponding cylinder head 5 to which it is connected. The two oil-air separating elements 16 are inclined with respect to the vertical line V and are situated in a V-shape with respect to one another. A different mounted position, particularly a vertical position, is also easily possible. In this embodiment, the oil-air separating elements are constructed as so-called swirl pots and have a housing 37, into which the inlet pipe 36 leads in an upper area, and out of which the breathing opening 19 leads. In the interior of the housing, a guiding spiral 38 is constructed along which the oil-air foam flows and is separated. By way of the breathing opening 19, the separated air can escape by way of an upper section of the crankshaft case 1, 2, while the separated defoamed oil flows off by way of the oil drain 17 into the lower part of the crankshaft case 1, 2 or the oil pan 18.

In the case of the illustrated construction of the timing drive of the internal-combustion engine, the two cylinder heads 5 and the cylinder head covers 6 are identical components which are installed in an offset manner corresponding to the position of the timing cases 11 or of the driving devices 23, 25 of the respective camshafts. Correspondingly, the two lubricant pumps 12 also have the same construction, in which case the respective rotating direction of the camshaft is taken into account by an installation of one of the two lubricant pumps 12 rotated by 180°.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. An internal-combustion engine comprising:

two cylinder banks inclined with respect to a vertical line, each cylinder bank having a cylinder head;

a crankshaft disposed in a crankshaft case;

an oil reservoir;

at least one camshaft arranged in each cylinder head and operationally coupled to the crankshaft by at least one driving device disposed in a housing which connects the interior of the crankcase and the interior of the respective cylinder head; and a lubricant pump arranged on each cylinder head, having a suction duct leading into the cylinder head and having a delivery side which is communicated with the oil reservoir via a return duct fixed to the housing, the lubricant pump being driven via the camshaft.

2. An internal-combustion engine according to claim 1, wherein the lubricant pump is arranged on an exterior wall of the cylinder head.

3. An internal-combustion engine according to claim 1, wherein an oil-air separating element is connected to the return duct of the lubricant pump.

4. An internal-combustion engine according to claim 3, wherein the oil-air separating element is arranged in the crankshaft case.

5. An internal-combustion engine according to claim 1, wherein the suction duct has a suction opening in an area of a lower wall of the cylinder head.

6. An internal-combustion engine according to claim 5, wherein the suction duct is constructed in a wall of a head cover of the cylinder head.

7. An internal-combustion engine according to claim 1, wherein the lubricant pump is an internal gear pump.

8. An internal-combustion engine according to claim 1, wherein the return duct is arranged at least partially in a wall of the housing.

9. An internal-combustion engine according to claim 1, wherein the return duct has a section which extends in parallel with and below the crankshaft in a wall of the crankshaft case.

10. An internal-combustion engine according to claim 3, wherein the oil-air separating element is arranged in an area which corresponds to a longitudinally central area of the crankshaft.

11. An internal-combustion engine according to claim 10, wherein the oil-air separating element is arranged on an opposite side of the crankshaft from its corresponding lubricant pump.

12. An internal-combustion engine according to claim 11, wherein the oil-air separating element of one lubricant pump and the oil-air separating element of the other lubricant pump are arranged in a V-shape.

13. An internal-combustion engine according to claim 1, wherein the lubricant pump is inserted from the outside into an opening in a front wall of the cylinder head and a front wall of a head cover.

14. An internal-combustion engine according to claim 1, wherein the cylinder banks are horizontally opposed.

15. An internal combustion engine comprising:

two cylinder banks inclined with respect to a vertical line, each cylinder bank having a cylinder head;

a crankshaft disposed in a crankshaft case;

an oil reservoir;

at least one camshaft arranged in each cylinder head and operationally coupled to the crankshaft by at least one driving device disposed in a housing; and a lubricant pump arranged on each cylinder head, having a suction duct leading into the cylinder head and having a delivery side which is communicated with the oil reservoir via a return duct fixed to the housing, the lubricant pump being driven via the camshaft, wherein an oil-air separating element is connected to the return duct of the lubricant pump, wherein the oil-air separating element is arranged in an area which corresponds to a longitudinally central area of the crankshaft, and wherein the oil-air separating element is arranged on an opposite side of the crankshaft from its corresponding lubricant pump.

16. An internal combustion engine according to claim 15, wherein the oil-air separating element of one lubricant pump and the oil-air separating element of the other lubricant pump are arranged in a V-shape.

17. An internal combustion engine according to claim 15, wherein the lubricant pump is inserted from the outside into an opening in a front wall of the cylinder head and a front wall of a head cover.

18. An internal combustion engine according to claim 15, wherein the cylinder banks are horizontally opposed.

* * * * *